United States Patent Office 3,128,293
Patented Apr. 7, 1964

3,128,293
3-OXYGENATED-5α-ANDROSTANE-2,17-DIONES
Paul D. Klimstra, Northbrook, Ill., assignor to G. D. Searle & Co., Chicago, Ill., a corporation of Delaware
No Drawing. Filed Oct. 4, 1962, Ser. No. 228,268
5 Claims. (Cl. 260—397.4)

The present invention relates to a group of 3-oxygenated derivatives of 5α-androstane-2,17-dione. More particularly, it relates to compounds of the following structural formula

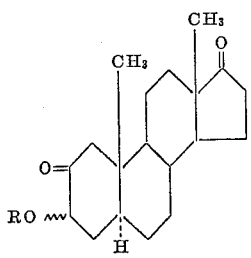

wherein R represents hydrogen, methyl, or lower alkanoyl. The lower alkanoyl radicals referred to above contain up to six carbon atoms and are exemplified by radicals such as acetyl, propionyl, and butyryl.

Starting materials used for the preparation of the compounds of the present invention are the 2,3-epoxy-5α-androstan-17-ones. If the 2β,3β-epoxide is heated with a lower alkanoic acid, the corresponding 3α-(lower alkanoyl)oxy-2β-hydroxy-5α-androstan-17-one is obtained, while if the same epoxide is treated with methanol in the presence of a trace of acid, 2β-hydroxy-3α-methoxy-5α-androstan-17-one is obtained. Oxidation of either of these 2β-hydroxy compounds with chromium trioxide in sulfuric acid gives the corresponding 5α-androstane-2,17-dione. These diones can be epimerized to the corresponding 3β-(lower alkanoyl)oxy or 3β-methoxy-5α-androstane-2,17 diones. The 3-(lower alkanoyl)-oxy compounds can be converted to the corresponding 3-hydroxy-5α-androstane-2,17-dione by acidic or basic hydrolysis or by alcoholysis with methanol.

If 2α,3α-epoxy-5α-androstan-17-one is treated with boron trifluoride, 3β-hydroxy-5α-androstane-2,17-dione is obtained. This compound can be methylated with dimethyl sulfate to give the corresponding 3β-methoxy compound, or it can be esterified by means of the appropriate lower alkanoyl halide or lower alkanoic acid anhydride to give the corresponding 3β-(lower alkanoyl)oxy-5α-androstane-2,17-dione.

The compounds of the present invention are useful because of their valuable pharmacological properties. In particular, the 3α-oxygenated compounds of the present invention, in addition to being useful as intermediates for the preparation of the corresponding 3β-compounds, are also anti-estrogenic agents as is evidenced by their ability to inhibit estrogen-stimulated biological responses. The 3β-oxygenated compounds of the present invention possess hormonal properties as is evidenced by their androgenic activity.

The invention will appear more fully from the examples which follow. These examples are set forth by way of illustration only, and it will be understood that the invention is not to be construed as limited in spirit or in scope by the details contained therein as many modifications in materials and methods will be apparent from this disclosure to those skilled in the art. In these examples, temperatures are given in degrees centigrade (° C.). Quantities of materials are expressed in parts by weight unless otherwise noted.

Example 1

A solution of 0.1 part of freshly distilled boron trifluoride etherate, 10 parts of 2α,3α-epoxy-5α-androstane-17-one, and 44 parts of dimethyl sulfoxide is heated on the steam bath for 3 hours. An additional 0.05 part of boron trifluoride ethereate is added and heating is continued for an additional 60 hours. The resulting solution is poured into water and extracted with 3 portions of chloroform. The combined chloroform extracts are washed twice with water and dried over anhydous potassium carbonate and charcoal. Evaporation of the solvent gives a brown oil which is then dissolved in benzene and chromatographed on a silica gel column. Elution with a 20% solution of ethyl acetate in benzene gives, after evaporation of the solvent and recrystallization from a mixture of acetone and hexane, 3β-hydroxy-5α-androstane-2,17-dione, melting at about 164–167° C.; $[\alpha]_D = +108.5°$ (chloroform). This compound has the following formula

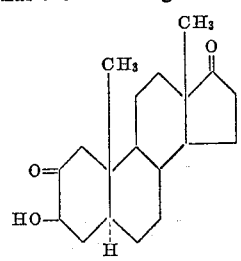

Example 2

A solution of 1.5 parts of 2β,3β-epoxy-5α-androstan-17-one in 16 parts of methanol containing 0.1 part of concentrated sulfuric acid is refluxed on a steam bath for 4 hours. The resultant mixture is poured into 130 parts of ice water and the precipitate which forms is separated, washed with water, and dried. Recrystallization of this solid from a mixture of acetone and hexane gives 3α-methoxy-2β-hydroxy-5α-androstan-17-one, melting at about 172–173° C.; $[\alpha]_D = +101°$ (chloroform).

To a solution of 0.4 part of 3α-methoxy-2β-hydroxy-5α-androstan-17-one in 18 parts of acetone is added portionwise, with stirring at room temperature, an aqueous solution which is 8 N in chromium trioxide and 8 N in sulfuric acid until the brown color persists. The excess chromium trioxide is destroyed by the addition of 2 drops of 2-propanol. Inorganic salts are removed from the solution by filtration. Water is then added portionwise to the filtrate until the solution becomes turbid. The mixture is then cooled, whereupon a solid precipitates and is filtered off. This product is 3α-methoxy-5α-androstane-2,17-dione, melting at about 163–163.5° C. It has the following formula

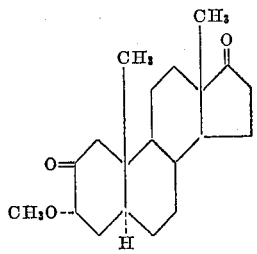

Example 3

A solution of 5 parts of 2β,3β-epoxy-5α-androstan-17-one and 130 parts of glacial acetic acid is heated on a steam bath for 4.5 hours. The mixture is then allowed to stand at room temperature for 15 hours before it is poured into ice water. The resultant mixture is extracted with ether and the combined ether extracts are washed first with water and then 15% sodium bicarbonate solution and finally dried over anhydrous potassium carbonate and charcoal. The solvent is removed under reduced pressure and the residue is dissolved in benzene and chromatographed on a silica gel column. Elution of the column with a 10% solution of ethyl acetate in benzene gives, after evaporation of the solvent and recrystallization of the residual solid from a mixture of acetone and hexane, 3α-acetoxy-2β-hydroxy-5α-androstan-17-one, melting at about 190–192° C.; [α]$_D$=+107.5° (chloroform).

An aqueous solution which is 8 N in chromium trioxide and 8N in sulfuric acid is added portionwise to a solution of 2 parts of 3α-acetoxy-2β-hydroxy-5α-androstane-17-one in 28 parts of acetone until the brown color persists. Excess chromium trioxide is destroyed by the addition of isopropyl alcohol. The liquid which is decanted from the salts which percipitated is poured into ice water. A precipitate forms; this is collected, washed with water, dried and then recrystallized from a mixture of acetone and hexane to give 3α-acetoxy-5α-androstane-2,17-dione, melting at about 155–156° C.; [α]$_D$=+37.5° (chloroform). This compound has the following formula

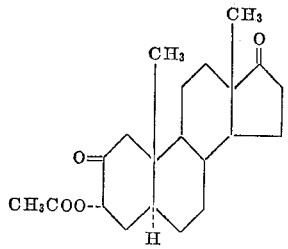

*Example 4*

A solution of 0.3 part of 3α-acetoxy-5α-androstane-2,17-dione and 0.8 part of potassium acetate in 12 parts of glacial acetic acid is refluxed for 5 hours. The resultant solution is poured into 80 parts of water. The precipitate which forms is separated, washed with water, and dried. This product is 3β-acetoxy-5α-androstane-2,17-dione, melting at about 182–184° C.; [α]$_D$=+140° (chloroform).

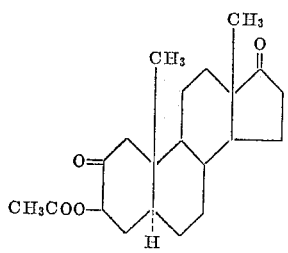

*Example 5*

2β,3β-epoxy-5α-androstan-17-one is reacted with propionic acid according to the procedure described in Example 3 to give 3α-propionoxy-2β-hydroxy-5α-androstan-17-one. This product is oxidized with chromium trioxide in sulfuric acid according to the procedure described in the second paragraph of Example 3 to give 3α-propionoxy-5α-androstane-2,17 dione. If this diketone is heated with propionic acid and the product is isolated from the reaction mixture according to the procedure described in Example 4, there is obtained 3β-propionoxy-5α-androstane-2,17-dione. This compound has the following formula

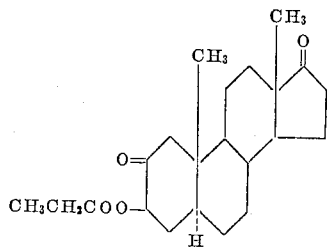

What is claimed is:
1. A compound of the formula

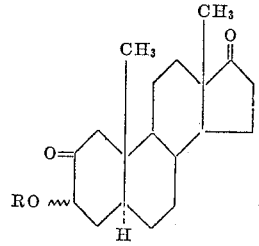

wherein R is selected from the group consisting of hydrogen, methyl, and lower alkanoyl.

2. A compound of the formula

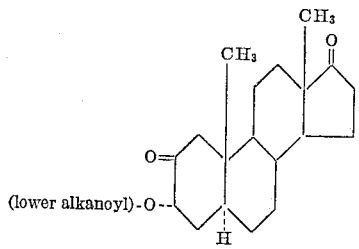

3. 3α-Acetoxy-5α-androstane-2,17-dione.
4. A compound of the formula

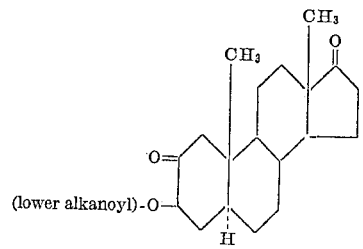

5. 3β-Acetoxy-5α-androstane-2,17-dione.

No references cited.